Figure 1:
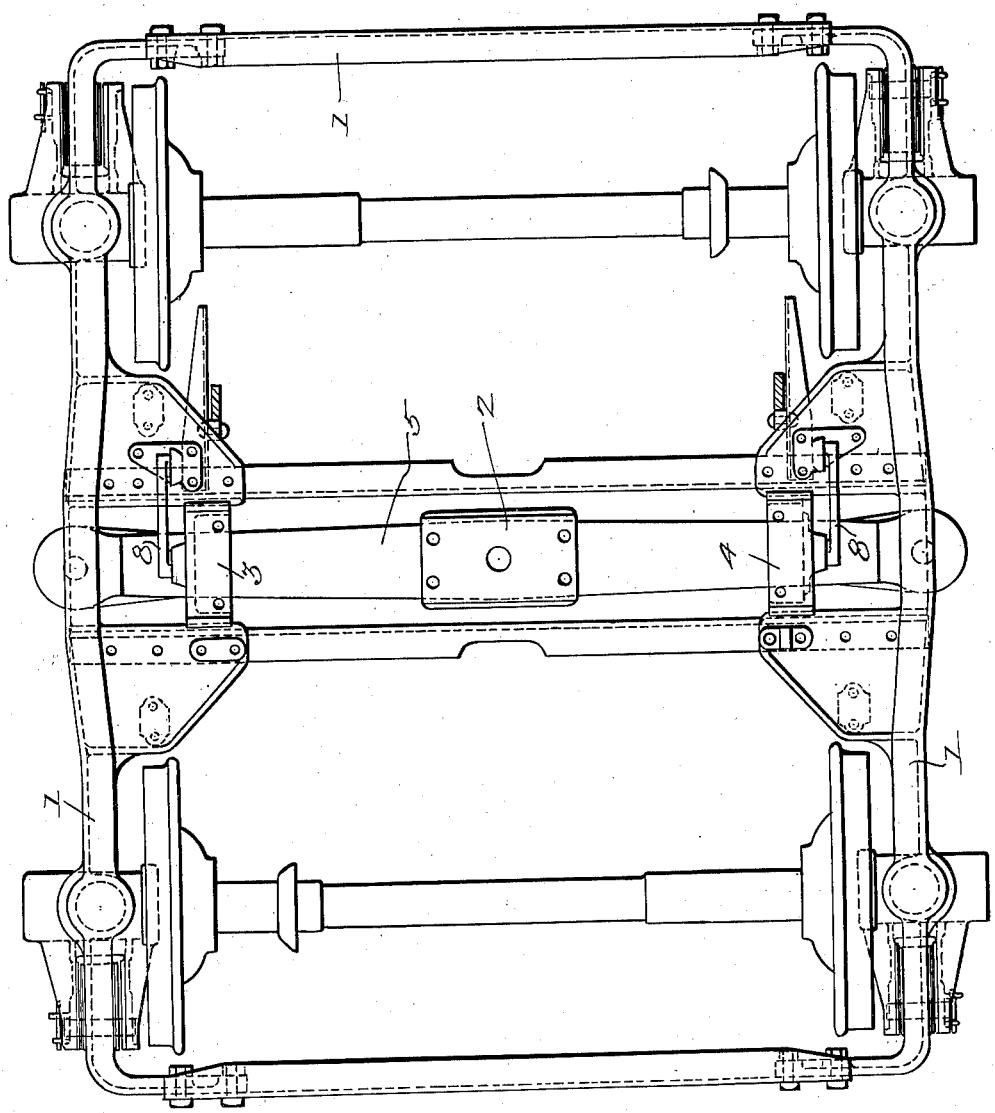

June 10, 1930.  E. LATSHAW  1,763,434
CAR TRUCK
Filed May 4, 1929  2 Sheets-Sheet 1

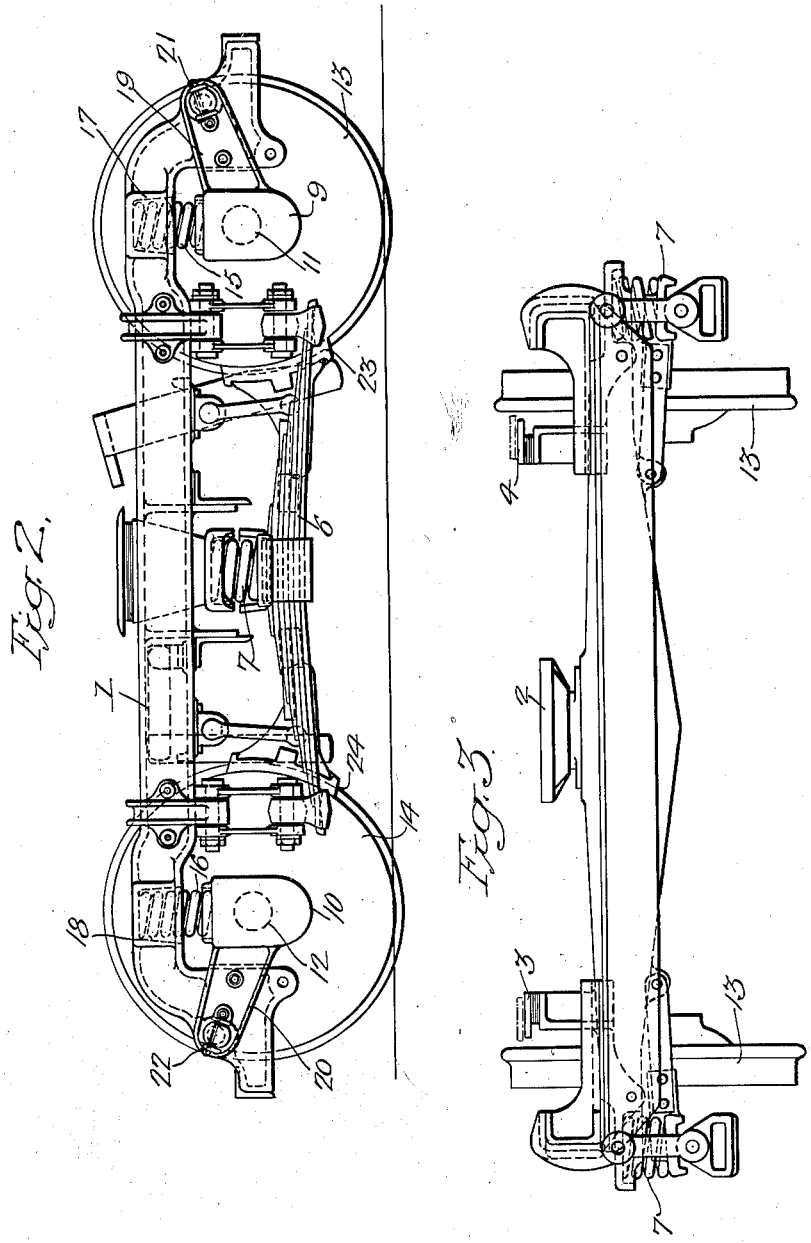

Patented June 10, 1930

1,763,434

UNITED STATES PATENT OFFICE

ELMER LATSHAW, OF PHILADELPHIA, PENNSYLVANIA, ASSIGNOR TO THE J. G. BRILL COMPANY, OF PHILADELPHIA, PENNSYLVANIA, A CORPORATION OF PENNSYLVANIA

CAR TRUCK

Application filed May 4, 1929. Serial No. 360,440.

This invention relates to a car truck, and is more particularly concerned with an improved manner of mounting a truck on the journal boxes.

In a car truck construction according to the prior art, the journal box usually works in a pedestal jaw in such manner that the box bears principally against one side or the other of the jaws of the pedestal, according to the direction in which the car is moving, and also in accordance with whether the car is being accelerated or being decelerated by means of application of the brakes. Even when the car is running free, the sides of the journal box rub against the jaw of the pedestal as a result of the spring over the journal box constantly deflecting, due to irregularities of the rail. This causes the sides of the journal box to wear more or less rapidly. A further detrimental feature of the construction according to the prior art is that when the brakes are applied to the wheels to stop the car, they force one side of the journal box hard against the pedestal, thus creating sufficient friction to prevent the springs over the journal boxes from functioning. Further, the wear of the sides of the journal boxes and the pedestals allow the wheel base to spread. The spread of the wheel base makes it necessary to allow a greater shoe clearance to the wheel.

A still further disadvantageous feature results as a consequence of the fact that when a car is loaded, the springs over the journal boxes are compressed, thus dropping the brake shoes lower on the wheel and increasing the space therebetween. At this time, when automatic slack adjusters are employed, these latter frequently operate to decrease the distance between the brake shoes and the wheels. When at a later time the car is unloaded, the springs over the journal box then resume their original position and raise the brake shoes, truck frame, etc., and in many instances, this raising of the brake shoes forces them against the wheels and locks them.

By my construction these undesirable points are avoided. In the present instance, the journal boxes are attached to the truck frame solely by means of a pivotal mounting, preferably in the form of an arm extending upwardly and outwardly from each journal box. The springs arranged above the journal boxes are each retained in outwardly tapering seats arranged in the frame. Thus the springs are free to move in their desired manner, and when the truck springs are depressed by means of increased load, the truck frame is depressed at the same time, and the connecting arms between the journal boxes and the frame swing about their pivot points in such manner as to decrease the wheel-base of the truck in an amount corresponding to the increased distance which the brake shoes would ordinarily move from the wheels.

An object of my invention, therefore, is to improve the truck construction of the prior art.

Another object is to produce a new and improved form of car truck.

Another object is to produce a car truck having a journal box connected thereto at but a single point.

Another object is to produce a car truck having a journal box pivotally connected thereto at but a single point.

Another object is to produce a car truck having a journal box pivotally secured thereto by an arm extending outwardly from the journal box.

Another object is to produce a car truck having means for compensating for the increased distance between the brake shoes and the wheels normally resulting from loading of the car and consequent depression of the truck frame on its supporting springs.

Another object is to produce a car truck having a journal box so constructed that it will freely float relative to the car frame.

Another object is to produce a car truck so constructed that the springs above the journal box will float freely at all times, and will have no tendency to bind.

Other objects will appear hereinafter.

In the drawings, in which is illustrated one form of my invention;

Fig. 1 is a plan view;
Fig. 2 is a side elevation thereof, while
Fig. 3 is an end elevation.

Referring more particularly to the drawings, at 1 is broadly indicated a truck frame of conventional construction having a center bearing 2 and side bearings 3 and 4, and bolster 5. This bolster, while it may be of suitable construction, in the present instance is shown as guided in its movement under influence of leaf springs 6 and bolster coil springs 7, by means of bolster guides 8 pivoted to the truck frame. Journal boxes 9 and 10 are shown as receiving the axles 11 and 12 respectively of wheels 13 and 14. Above these boxes coiled springs 15 and 16 bear thereagainst and are received in tapered cap portions 17 and 18 provided in the truck frame 1. Arms 19 and 20 are secured to the exterior walls of the journal boxes 9 and 10, respectively, and form the only means of connection between the journal boxes and the truck frame. These arms extend upwardly and outwardly, and are pivoted at 21 and 22 respectively to the truck frame. The arms are of such length and are connected to the truck frame at such distance above the center of the axles 11 and 12, that any tendency of the brake shoes 23 and 24 to separate from the wheels 13 and 14 as a result of the loading of the car is substantially exactly compensated by a decrease in the wheel-base. In other words, when the truck frame 1 is lowered as a result of loading, the arms 19 and 20 are pivoted and swung through vertical arcs about the centers 21 and 22, thus forcing the journal boxes slightly inwardly. Thus the location of the connection of the pivot arms of the truck frame is such that when the journal box springs 15 and 16 are compressed and the brakes 23 and 24 lowered, the wheel-base of the truck is reduced correspondingly, so that the brake shoes will have the same relation to the wheel when the car body is carrying its maximum load, as when the load is at a minimum.

Attention is directed to the fact that the centers of axles 11 and 12 and the pivots 21 and 22 are aligned with the approximate centers of their respective brake shoes. As long as this relation is maintained, the compensation for separation of the brake shoes from the wheels upon relative movement of the axles and frame will be maintained without regard to the specific location of the pivots 21 and 22. This is due to the fact that with the pivot, axle and brake in the relative positions above set forth, movement of the wheel with relation to the brake will always be in a general direction substantially perpendicular to a plane including the center of the axle and passing through the brake at the center thereof. Obviously, these pivots could be shifted inwardly to a position approximating the center of the brake shoe at the inner sides of the wheel and accomplish the same function. Due, however, to the fact that to practically apply a brake shoe the same must be applied so that the center lies well below a horizontal plane including the axis of the axle, these pivots if arranged outwardly of the axles must be well above the axles, and if arranged inwardly of the axles must be well below the same.

This construction results in an easier riding truck frame, and at the same time a maximum efficiency of braking, together with a minimum travel of the brake rigging under all operating conditions. Since there is no contact of the journal box with the side frame, such as in the old type of construction, which causes these parts to become noisy when they are worn, the construction is characterized by extreme quietness in operation.

It is of course understood that the pivot arms 19 and 20 will be composed of suitable material, such as hardened members, which are preferably replaceable. It is obvious that this invention is susceptible to numerous modifications and adaptations, and it is intended that it be limited only by the scope of the appended claims.

I claim:

1. In a car truck, a frame, at least one journal box on said truck, said journal box being connected to said frame at but a single point arranged outwardly and upwardly of said journal box.

2. In a car truck, a frame, at least one journal box on said truck, and an arm secured to the exterior of said journal box and extending upwardly and outwardly therefrom to a point where it is connected with said truck, the said arm forming the only positive connection between said journal box, and said truck.

3. In a car truck, a frame, at least one journal box in said truck, an arm secured to the exterior of said journal box and extending upwardly and outwardly therefrom, and pivotally secured adjacent its outer end to the frame, and a cap portion in said frame tapering inwardly thereof and adapted to receive said spring for substantially free movement therein.

4. In a car truck, a frame, spaced supporting axles therefor having the usual wheels, brake mechanism engaging adjacent faces of the wheels at corresponding sides of the truck and connections between the axles and the frame moving the axles and their wheels toward the center of the truck when the frame approaches the axles, to compensate for increase in distance between the adjacent faces of the wheels at the point of engagement of the brakes therewith when the frame approaches the axles.

5. In a car truck, a frame, a supporting axle therefor, a brake shoe carried by the frame for engagement with a wheel carried by the axle, the brake shoe engaging the wheel below the center thereof whereby upon depression of the frame the brake shoe tends to separate from the wheel, and means for moving the axle upon depression of the frame to maintain the wheel in engagement with the brake.

6. In a car truck, a frame, spaced wheel-supported axles, a yieldable support between the axles and the frame, brake shoes carried by the frame and engaging the wheels at points such that upon depression of the frame the brake shoes tend to separate from the wheels, and means for shifting the axles towards their associated brakes upon depression of the frame to prevent such separation.

7. In a car truck, a frame, spaced supporting axles for the frame, yieldable elements interposed between the axles and frame, brake shoes carried by the frame and engaging the wheels of the axles at points such that they tend to separate from the wheels upon depression of the frame, and means causing movement of the wheels in a direction approximately perpendicular to a plane including the axes of their axles and the centers of their associated brake shoes.

8. In a car truck, a frame, journal boxes under-lying the frame, at points spaced inwardly from the ends of the frame, and arms secured to said journal boxes and extending upwardly and outwardly therefrom and pivotally connected to the frame.

9. In a car truck, a frame, an axle resiliently supporting the frame, a wheel carried by said axle, a brake shoe engaging said wheel at a point below the center thereof, and a journal box for said axle having an arm pivotally engaging the frame, the pivotal connection of the arm to the frame and the center of the axle being approximately aligned with the center of said brake shoe.

10. In a car truck, a frame, an axle resiliently supporting the frame, a wheel on said axle, a brake-shoe supported by the frame at a point below the center of the wheel, and a journal box for said axle having an arm pivotally engaging the frame and shifting the journal box upon relative movement of the frame and axle to maintain a constant clearance relation of brake-shoe to wheel under service conditions.

ELMER LATSHAW.